United States Patent
Muroor

(10) Patent No.: US 7,203,779 B2
(45) Date of Patent: Apr. 10, 2007

(54) FAST TURN-OFF SLOW TURN-ON ARBITRATOR FOR REDUCING TRI-STATE DRIVER POWER DISSIPATION ON A SHARED BUS

(75) Inventor: Srikanth R. Muroor, Walnut Creek, CA (US)

(73) Assignee: STMicroelectronics, Inc., Carrollton, TX (US)

( * ) Notice: Subject to any disclaimer, the term of this patent is extended or adjusted under 35 U.S.C. 154(b) by 312 days.

(21) Appl. No.: 10/060,454

(22) Filed: Jan. 30, 2002

(65) Prior Publication Data

US 2003/0145145 A1 Jul. 31, 2003

(51) Int. Cl.
*G06F 13/00* (2006.01)
*G06F 13/362* (2006.01)

(52) U.S. Cl. .................. 710/107; 710/113; 710/114

(58) Field of Classification Search ........ 710/240–241, 710/305, 113, 107, 52, 114; 326/56; 327/392; 713/401
See application file for complete search history.

(56) References Cited

U.S. PATENT DOCUMENTS

| | | | | |
|---|---|---|---|---|
| 3,886,543 A | * | 5/1975 | Marin ..................... | 341/24 |
| 4,843,596 A | * | 6/1989 | Miyatake et al. ........ | 365/233.5 |
| 5,044,167 A | * | 9/1991 | Champagne ............. | 62/115 |
| 5,306,963 A | * | 4/1994 | Leak et al. .............. | 327/14 |
| 5,319,768 A | * | 6/1994 | Rastegar ................. | 711/131 |
| 6,163,850 A | * | 12/2000 | Wood ..................... | 713/500 |
| 2003/0085734 A1 | * | 5/2003 | Nguyen .................. | 326/46 |

OTHER PUBLICATIONS

Hill, Frederick J. et al. Computer Aided Logical Design With Emphasis on VLSI. Fourth Edition. 1993. John Wiley & Sons, Inc. ISBN 0-471-57527-5. pp. 54-57.*

* cited by examiner

*Primary Examiner*—Mark H. Rinehart
*Assistant Examiner*—Thomas J. Cleary
(74) *Attorney, Agent, or Firm*—Lisa K. Jorgenson; William A. Munck

(57) ABSTRACT

A bus arbitrator for use in a shared bus system in which N bus devices request access to a shared bus. The bus arbitrator slowly activates and rapidly de-activates tristate line drivers coupled to the shared bus. The bus arbitrator comprises: 1) an input interface for receiving a first bus access request signal from a first bus device; 2) a delay circuit that receives the first bus access request signal from the input interface and generates a time-delayed first bus access request signal; and 3) a comparator circuit that receives the first bus access request signal from the input interface and the time-delayed first bus access request signal from the delay circuit and generates a line driver enable signal only if both of the first bus access request signal and the time-delayed first bus access request signal are enabled. The comparator circuit disables the line driver enable signal if either of the first bus access request signal or the time-delayed first bus access request signal is disabled.

21 Claims, 2 Drawing Sheets

FAST TURN-OFF SLOW TURN-ON ARBITRATOR FOR REDUCING TRI-STATE DRIVER POWER DISSIPATION ON A SHARED BUS

TECHNICAL FIELD OF THE INVENTION

The present invention is directed generally to data processors and other circuits that operate on a shared address or data bus driven by buffers having tri-state outputs.

BACKGROUND OF THE INVENTION

There have been great advances in the speed and power of integrated circuits, such as application specific integrated circuit (ASIC) chips, random access memory (RAM) chips, microprocessor (uP) chips, and the like. These advances have made possible large scale integration of complex electronic systems onto only a few integrated circuit chips. In some cases, a complex electrical system (i.e., cell phone, television receiver, or the like) may be integrated onto a single system-on-a-chip (SOC) device. SOC devices greatly reduce the size, cost, and power consumption of the system.

An important consideration of any highly integrated electronic system is power consumption. Minimizing power consumption reduces the cost of operating an electronic component and also reduces the heat dissipation requirements of the device in which the electronic component is disposed.

Buffer circuits (i.e., line drivers) with tristate outputs allow multiple hardware resources (e.g., any generalized processing system) to share a common bus (address or data) in a time-multiplexed fashion. At any instant, one hardware resource has exclusive access to the bus, while other resources await their turn to gain access to the bus. Requests for the bus from hardware resources are sent to an arbitrator, which resolves these requests, and grants exclusive access to one resource. The hardware resources send bus access requests to a bus arbitrator circuit. The arbitrator resolves these requests and grants exclusive access to one resource by means of enable signals. These enable signals establish a connection between the bus and the requesting resource by means of tri-state buffer circuits.

Dynamic power dissipation in the tristate buffers consists of two components:

1) Load power—If a large number of hardware resources share the bus, it presents a large load capacitance to the tristate buffers/line drivers. Electrical power is dissipated in the tristate line drivers when this load capacitance is charged and discharged.

2) Short circuit power—Ideally, when a tristate driver connected to a hardware resource is turned ON, all of the tristate line drivers connected to the other hardware resources on the shared bus are turned OFF to avoid a short-circuit current through the drivers. In practice, however, this does not happen due to unequal delays in the bus arbitrator circuit. The resulting short-circuit currents are significant, because the tristate drivers are designed to supply large currents to quickly charge or discharge the bus capacitance.

FIG. 2 illustrates bus arbitrator 210 and tristate line drivers 230A and 230B associated with shared data bus 240 according to an exemplary embodiment of the prior art. FIG. 3 is a timing diagram illustrating the operation of bus arbitrator 210 and tristate line driver 230A and 230B in FIG. 2. In the illustrated embodiment, bus arbitrator 210 provides enable signals EN1 and EN2 to tristate line drivers 230A and 230B, respectively. Tristate line drivers 230A and 230B are connected to Data Bit Line 1 of exemplary shared data bus 240. Arbitrator 210 implements a simple static priority-based arbitration mechanism.

AS FIG. 3 illustrates, the REQ1 line is turned ON and the REQ2 line is turned OFF simultaneously. When REQ1 is turned ON, arbitrator 210 activates the EN1 enable signal, which takes line driver 230A out of a high-impedance state and allows line driver 230A to write Data Bit 1 (DB1) from a first hardware source to Date Bit Line 1 of shared bus 240. When REQ2 is turned OFF, arbitrator 210 de-activates the EN2 enable signal, which puts line driver 230B into a high-impedance state and prevents line driver 230B from writing Data Bit 1 (DB1) from a second hardware source to Date Bit Line 1 of shared bus 240.

However, due to unequal propagation delays caused by inverter 215 and AND gate 220, the EN1 enable signal does not turn ON after or simultaneously with the EN2 enable signal turning OFF. As a result, the EN1 enable signal and the EN2 enable signal are both ON during the period T1 in FIG. 3. Line driver 230A is being driven by a data bit, DB1, equal to Logic 1 from a first hardware source. Line driver 230B is being driven by a data bit, DB1, equal to Logic 0 from a second hardware source. During the time period T1, line driver 230A tries to drive Data Bit Line 1 of shared bus 240 high at the same time that line driver 230B pulls Data Bit Line 1 of shared bus 240 low by sinking current. Thus, a short circuit current flows between tristate line drivers 230A and 230B during the time period T1, causing a large an unnecessary power dissipation. The faster shared bus 240 operates, the more often such short-circuits occur and the higher the power dissipation.

Therefore, there is a need in the art for an improved bus arbitrator that reduces the power consumption of a shared bus system. In particular, there is a need for a bus arbitrator that prevents short-circuits between tristate line drivers on a common address or data bus.

SUMMARY OF THE INVENTION

This present invention provides an improved bus arbitrator that completely eliminates bus contentions. The enable signal to every tristate line driver (buffer) is generated so that the turn-off (i.e., logic level state to high impedance state) time of the line driver is significantly lower than the turn-on (high impedance state to logic state) time with respect to the hardware resource requesting access to the shared bus.

To address the above-discussed deficiencies of the prior art, it is a primary object of the present invention to provide, for use in a shared bus system comprising a plurality of bus devices capable of requesting access to a shared bus, a bus arbitrator operable to slowly activate and rapidly de-activate tristate line drivers coupled to the shared bus. According to an advantageous embodiment of the present invention, the bus arbitrator comprises: 1) an input interface capable of receiving a first bus access request signal from a first of the plurality of bus devices; 2) a delay circuit capable of receiving the first bus access request signal from the input interface and generating therefrom a time-delayed first bus access request signal; and 3) a comparator circuit capable of receiving the first bus access request signal from the input interface and the time-delayed first bus access request signal from the delay circuit and generating a line driver enable signal only if both of the first bus access request signal and the time-delayed first bus access request signal are enabled.

According to one embodiment of the present invention, the comparator circuit disables the line driver enable signal if either of the first bus access request signal and the time-delayed first bus access request signal is disabled.

According to another embodiment of the present invention, a time delay of the delay circuit is greater than a maximum de-activation delay period associated with the tri-state line drivers.

According to still another embodiment of the present invention, the comparator circuit comprises an AND gate having a first input for receiving the first bus access request and a second input for receiving the time-delayed first bus access request signal.

According to yet another embodiment of the present invention, the delay circuit is an asynchronous delay circuit.

According to a further embodiment of the present invention, the delay circuit comprises an even number of inverters connected in series, wherein a first of the even number of inverters receives the first bus access request signal from the input interface and a last of the even number of inverters generates the time-delayed first bus access request signal.

According to a still further embodiment of the present invention, the delay circuit is a synchronous delay circuit.

According to a yet further embodiment of the present invention, the delay circuit comprises a flip-flop having an input capable of receiving the first bus access request signal from the input interface and an output coupled to the comparator circuit that generates the time-delayed first bus access request signal.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 6, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged data processor or other circuit that uses a shared bus that is driven by tri-state buffers.

Figure 1:
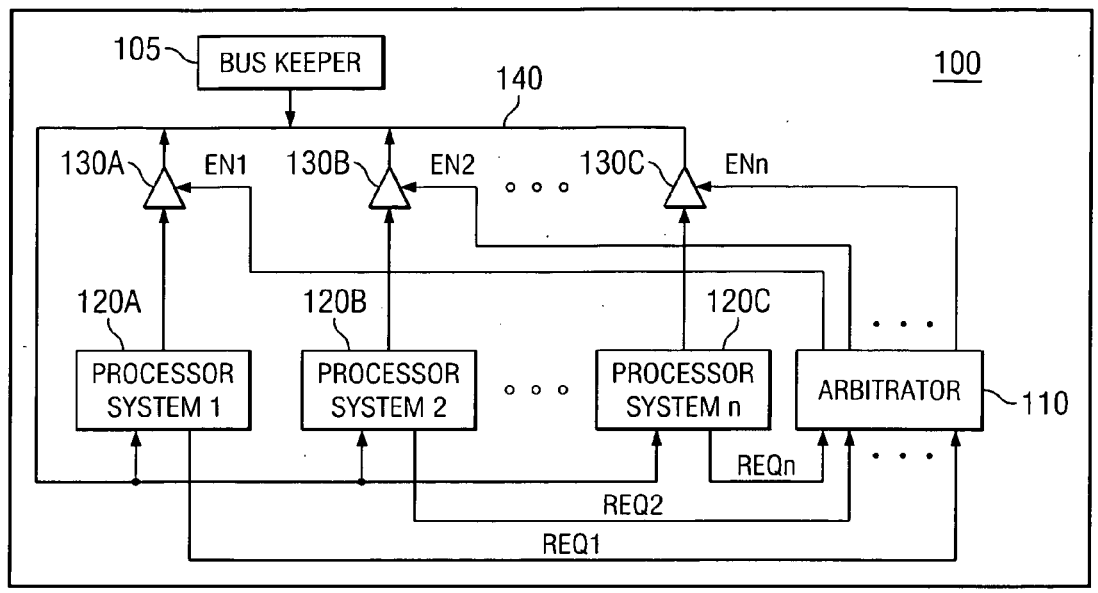
FIG. 1 illustrates an exemplary shared bus system that implements a fast turn-off slow turn-on bus arbitrator according to the principles of the present invention.
Figure 2:
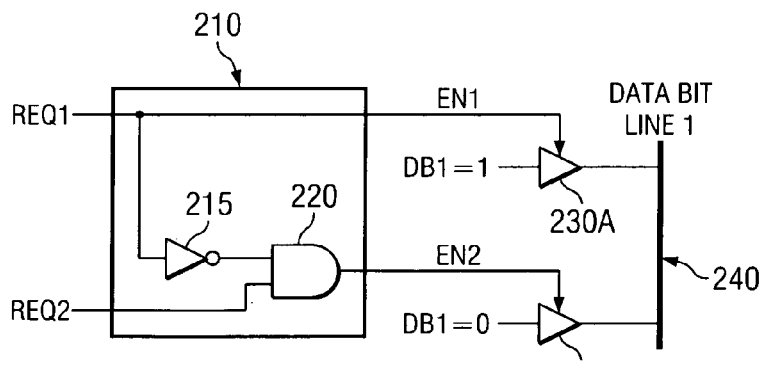
FIG. 2 illustrates a bus arbitrator and tristate line drivers associated with a shared data bus according to an exemplary embodiment of the prior art.
Figure 3:
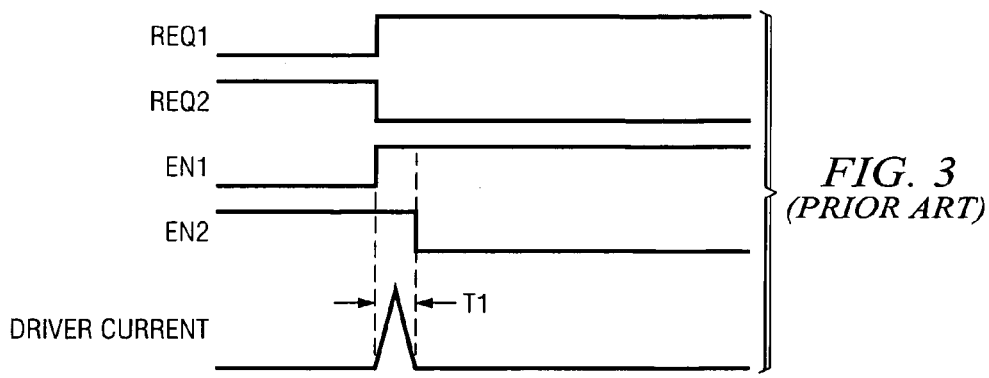
FIG. 3 is a timing diagram illustrating the operation of the bus arbitrator and tristate line drivers in FIG. 2.

FIG. 1 illustrates exemplary shared bus system 100, which implements fast turn-off, slow turn-on bus arbitrator 110 according to the principles of the present invention. Shared bus system 100 comprises bus keeper 105, bus arbitrator 110, and N processing systems 120, including exemplary processing systems 120A, 120B, and 120C, which are labeled Processing System 1, Processing System 2, and Processing System N, respectively. Shared bus system 100 further comprises N tristate line drivers 130, including exemplary line drivers 130A, 130B, and 130C, which are switched between logic states and high-impedance states by the enable signals EN1, EN2, and ENn, respectively. The N tristate line drivers 130 are capable of driving shared (address or data) bus 140. Bus keeper 105 is used to hold the lines of shared data bus 140 at particular logic levels if all line drivers are in high-impedance states.

N processing systems 120 are generic representations of any type of hardware resource (data processor, memory controller, input/output (I/O) interface, ASIC system, peripheral, or the like) that is capable of requesting access to shared bus 140. Each processing system 120 sends an access request (REQ) signal to arbitrator 110, which responds by activating an enable signal for a tristate line driver associated with the requesting processing system 120 and deactivating any other enable signal. For example, if processing system 120A sends the REQ1 signal to arbitrator 110, arbitrator 110 responds by activating the EN1 signal for tristate line driver 130A and deactivating any other enable signal (i.e., EN2). Line driver 130A then writes the data from processing system 120A onto shared bus 140.

Figure 4:
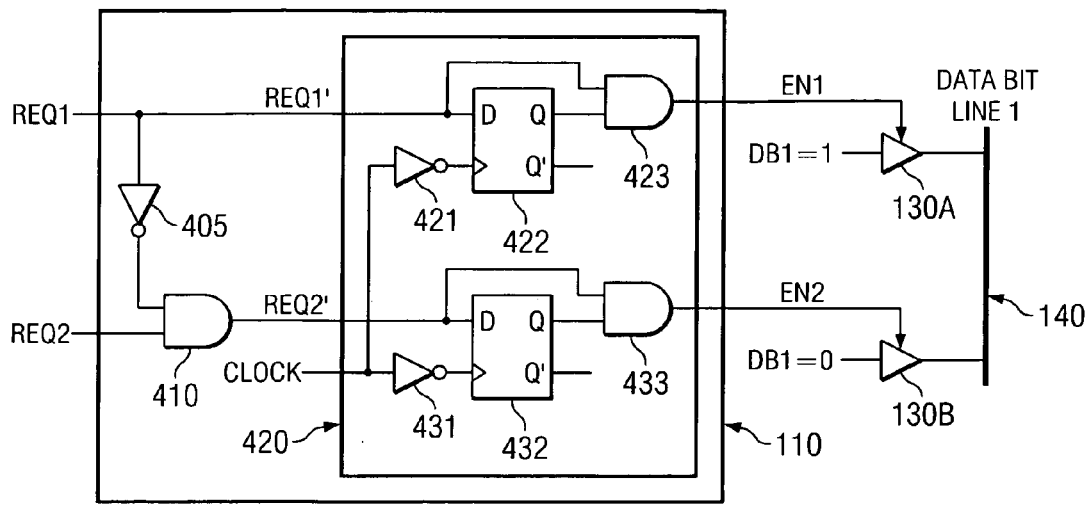
FIG. 4 illustrates an improved bus arbitrator for use with an exemplary shared address or data bus according to an exemplary embodiment of the present invention.
Figure 5:
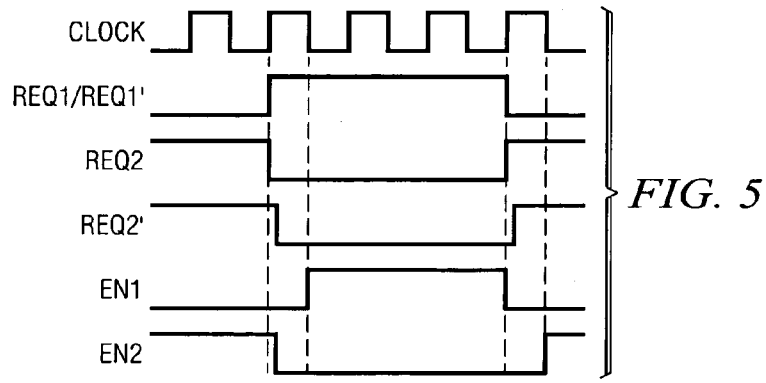
FIG. 5 is a timing diagram illustrating the operation of the exemplary bus arbitrator in FIG. 4 according to one embodiment of the present invention.

In accordance with the principles of the present invention, arbitrator 110 provides a fast turn-off, slow turn-on mechanism for preventing bus contentions on shared bus 140. FIG. 4 illustrates improved bus arbitrator 110 for use with exemplary shared address or data bus 140 according to an exemplary embodiment of the present invention. FIG. 5 is a timing diagram illustrating the operation of exemplary bus arbitrator 110 in FIG. 4 according to one embodiment of the present invention.

Bus arbitrator 110 comprises inverter 405, AND gate 410, and fast turn-off, slow turn-on controller 420. Controller 420 comprises inverters 421 and 431, D-gate flip-flops (FF) 422 and 432, and AND gates 423 and 433. Controller 420 is clocked by the CLOCK signal, which causes D-gate flip-flops 422 and 423 to change state on the falling edges of the CLOCK signal. The inputs to controller 420 are REQ1' and REQ2'. The REQ1' access signal is the same as the REQ1 access request signal and the REQ2' access signal is generated by inverter 405 and AND gate 410. The REQ2' signal lags the REQ1 and REQ2 signals due to the gates delays of inverter 405 and AND gate 410. The respective timing of REQ1, REQ2, REQ1' and REQ2' are shown in FIG. 5.

AND gate 423 compares the REQ1' access request signal to a time-delayed copy of itself. AND gate 423 sets the EN1 enable signal to Logic 1 only if REQ1' and its time-delayed copy are both equal to Logic 1. The time delay is introduced by D-gate flip-flop 422. However, EN1 returns to Logic 0 as soon as the REQ1' signal goes back to Logic 0 (i.e., without waiting for the time-delayed copy from the Q output of D-gate flip-flop 422 to return to Logic 0).

Similarly, AND gate 433 compares the REQ2' access request signal to a time-delayed copy of itself. AND gate 433 sets the EN2 enable signal to Logic 1 only if REQ2' and its time-delayed copy are both equal to Logic 1. The time delay is introduced by D-gate flip-flop 432. However, EN2 returns to Logic 0 as soon as the REQ2' signal goes back to Logic 0 (i.e., without waiting for the time-delayed copy from the Q output of D-gate flip-flop 432 to return to Logic 0).

In the exemplary embodiment circuit, it is assumed that REQ1 and REQ2 are synchronous to a system clock. Fast turn-off, slow turn-on controller 420 delays the low-to-high transitions on the EN1 and EN2 enable signals by one-half clock cycle, whereas the high-to-low transition on the EN1 and EN2 enable signals experience only the lesser delays of AND gates 423 and 433. This ensures that all line drivers 130 are turned OFF (i.e., in high-impedance state) before any line driver 130 is turned ON. As a result, short circuit currents due to contentions are completely eliminated by bus arbitrator 110.

It was noted that controller 420 introduces a one-half clock cycle delay into the bus due to its sequential behavior. This is acceptable in situations in which the hardware resources are synchronous to the system clock and have sufficient timing slack to accommodate this delay. However, in cases where such delay is not acceptable, a combinational delay may be used as illustrated in FIG. 6, to achieve fast turn-off and slow turn-on times.

Figure 6:
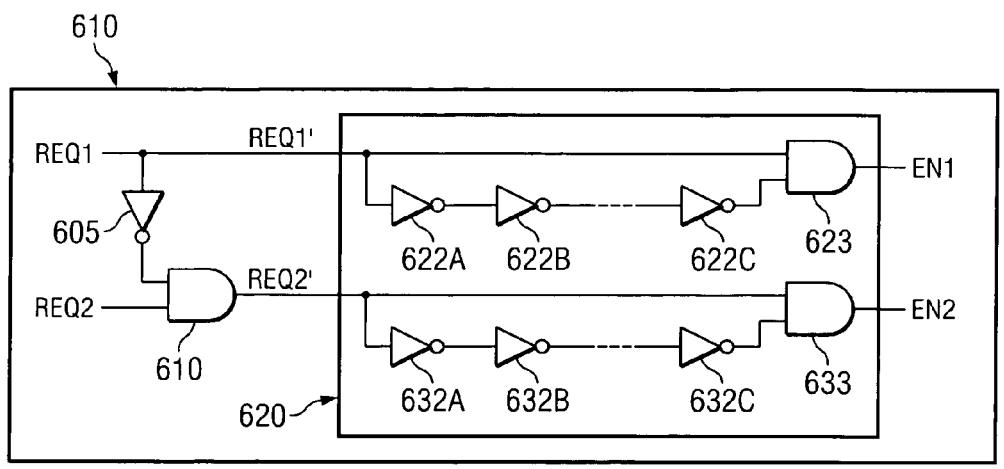
FIG. 6 illustrates selected portions of the improved bus arbitrator according to an alternate embodiment of the present invention.

FIG. 6 illustrates selected portions of improved bus arbitrator 610 according to an alternate embodiment of the present invention. Arbitrator 610 is similar to arbitrator 110 in FIG. 4 except that the synchronous delay elements (i.e., D-gate flip-flops) in fast turn-off, slow turn-on controller 420 have been replaced in fast turn-off, slow turn-on controller 620 by an even number (2N) inverters 622 that introduce the delay.

AND gate 623 compares the REQ1' access request signal to a time-delayed copy of itself. AND gate 623 sets the EN1 enable signal to Logic 1 only if REQ1' and its time-delayed copy are both equal to Logic 1. The time delay is introduced by 2N inverters 622, including inverter 622A, inverter 622B, . . . , inverter 622C. However, EN1 returns to Logic 0 as soon as the REQ1' signal goes back to Logic 0 (i.e., without waiting for the time-delayed copy from inverters 622 to return to Logic 0).

Inverter 605 and AND gate 610 generate the REQ2' access request signal. AND gate 633 compares the REQ2' access request signal to a time-delayed copy of itself. AND gate 633 sets the EN2 enable signal to Logic 1 only if REQ2' and its time-delayed copy are both equal to Logic 1. The time delay is introduced by 2N inverters 632, including inverter 632A, inverter 632B, . . . , inverter 632C. However, EN2 returns to Logic 0 as soon as the REQ2' signal goes back to Logic 0 (i.e., without waiting for the time-delayed copy from inverters 632 to return to Logic 0).

Although the present invention has been described in detail, those skilled in the art should understand that they can make various changes, substitutions and alterations herein without departing from the spirit and scope of the invention in its broadest form.

What is claimed is:

1. A bus arbitrator comprising:

an input circuit receiving a first bus access request signal from a first bus device and a second bus access request signal from a second bus device, the input circuit outputting the second bus access request signal when the first bus access request signal is not enabled and blocking the second bus access request signal when the first bus access request signal is enabled, the input circuit associated with a first delay;

a delay circuit generating a time-delayed first bus access request signal from the first bus access request signal and a time-delayed second bus access request signal from the second bus access request signal, the delay circuit associated with a second delay; and a comparator circuit generating a first line driver enable signal only if both the first bus access request signal and the time-delayed first bus access request signal are enabled and generating a second line driver enable signal only if both the second bus access request signal and the time-delayed second bus access request signal are enabled, wherein the second delay delays low-to-high transitions in the first and second line driver enable signals by no more than one-half of a clock cycle of a clock signal, and wherein the first delay delays high-to-low transitions in the second line driver enable signal by an amount less than the second delay but does not delay high-to-low transitions in the first line driver enable signal.

2. The bus arbitrator as set forth in claim 1 wherein the comparator circuit:

disables the first line driver enable signal if either of the first bus access request signal or the time-delayed first bus access request signal is disabled; and disables the second line driver enable signal if either of the second bus access request signal or the time-delayed second bus access request signal is disabled.

3. The bus arbitrator as set forth in claim 2 wherein the second delay of the delay circuit is greater than a maximum de-activation delay period associated with tri-state line drivers on a shared bus.

4. The bus arbitrator as set forth in claim 3 wherein the comparator circuit comprises:
a first AND gate having a first input receiving the first bus access request signal and a second input receiving the time-delayed first bus access request signal; and
a second AND gate having a first input receiving the second bus access request signal and a second input receiving the time-delayed second bus access request signal.

5. The bus arbitrator as set forth in claim 3 wherein the delay circuit is an asynchronous delay circuit.

6. The bus arbitrator as set forth in claim 5 wherein the delay circuit comprises:
a first set of an even number of inverters connected in series, wherein a first inverter in the first set receives the first bus access request signal and a last inverter in the first set generates the time-delayed first bus access request signal; and
a second set of an even number of inverters connected in series, wherein a first inverter in the second set receives the second bus access request signal and a last inverter in the second set generates the time-delayed second bus access request signal.

7. The bus arbitrator as set forth in claim 3 wherein the delay circuit is a synchronous delay circuit.

8. The bus arbitrator as set forth in claim 7 wherein the delay circuit comprises:
a first flip-flop having an input receiving the first bus access request signal and an output coupled to the comparator circuit that generates said time-delayed first bus access request signal;
a first inverter having an input receiving the clock signal and an output coupled to a clock input of the first flip-flop;
a second flip-flop having an input receiving the second bus access request signal and an output coupled to the comparator circuit that generates the time-delayed second bus access request signal; and
a second inverter having an input receiving the clock signal and an output coupled to a clock input of the second flip-flop.

9. The bus arbitrator of claim 1, wherein the input circuit comprises:
an inverter capable of receiving and inverting the first bus access request signal; and
an AND gate capable of receiving the inverted first bus access request signal and the second bus access request signal, the AND gate also capable of outputting the second bus access request signal when the first bus access request signal is not enabled and blocking the second bus access request signal when the first bus access request signal is enabled.

10. A shared bus system comprising:
N bus devices capable of requesting access to a shared bus;
M tristate line drivers, each of the M tristate line drivers having an input for receiving a logic bit from one of the N bus devices and an output for outputting the received logic bit to the shared bus, wherein each tristate line driver outputs the received logic bit when a line driver enable signal associated with the respective tristate line driver is enabled and an output of each tristate line driver is put into a high-impedance state when the associated line driver enable signal is disabled;
a bus arbitrator operable to activate and de-activate the M tristate line drivers, the bus arbitrator comprising:
an input circuit capable of receiving a first bus access request signal from a first of the N bus devices and a second bus access request signal from a second of the N bus devices, the input circuit also capable of outputting the second bus access request signal when the first bus access request signal is not enabled and blocking the second bus access request signal when the first bus access request signal is enabled, the input circuit associated with a first delay;
a delay circuit capable of receiving the first bus access request signal and generating therefrom a time-delayed first bus access request signal, the delay circuit also capable of receiving the second bus access request signal and generating therefrom a time-delayed second bus access request signal, the delay circuit associated with a second delay; and
a comparator circuit capable of generating a first line driver enable signal only if both the first bus access request signal and the time-delayed first bus access request signal are enabled, the comparator circuit also capable of generating a second line driver enable signal only if both the second bus access request signal and the time-delayed second bus access request signal are enabled, wherein the second delay delays low-to-high transitions in the line driver enable signals by no more than one-half of a clock cycle of a clock signal,
wherein the first delay delays high-to-low transitions in the second line driver enable signal by an amount less than the second delay but does not delay high-to-low transitions in the first line driver enable signal.

11. The shared bus system as set forth in claim 10 wherein the comparator circuit:
disables the first line driver enable signal if either the first bus access request signal or the time-delayed first bus access request signal is disabled; and
disables the second line driver enable signal if either of the second bus access request signal or the time-delayed second bus access request signal is disabled.

12. The shared bus system as set forth in claim 11 wherein the second delay of the delay circuit is greater than a maximum de-activation delay period associated with the tri-state line drivers.

13. The shared bus system as set forth in claim 12 wherein the comparator circuit comprises:
a first AND gate having a first input for receiving the first bus access request signal and a second input for receiving the time-delayed first bus access request signal; and
a second AND gate having a first input for receiving the second bus access request signal and a second input for receiving the time-delayed second bus access request signal.

14. The shared bus system as set forth in claim 12 wherein the delay circuit is an asynchronous delay circuit.

15. The shared bus system as set forth in claim 14 wherein the delay circuit comprises:
a first set of an even number of inverters connected in series, wherein a first inverter in the first set receives the first bus access request signal and a last inverter in the first set generates the time-delayed first bus access request signal; and
a second set of an even number of inverters connected in series, wherein a first inverter in the second set receives the second bus access request signal and a last inverter in the second set generates the time-delayed second bus access request signal.

16. The shared bus system as set forth in claim 12 wherein the delay circuit is a synchronous delay circuit.

17. The shared bus system as set forth in claim 16 wherein the delay circuit comprises:
- a first flip-flop having an input capable of receiving the first bus access request signal and an output coupled to the comparator circuit that generates the time-delayed first bus access request signal;
- a first inverter having an input capable of receiving the clock signal and an output coupled to a clock input of the first flip-flop;
- a second flip-flop having an input capable of receiving the second bus access request signal and an output coupled to the comparator circuit that generates the time-delayed second bus access request signal; and
- a second inverter having an input capable of receiving the clock signal and an output coupled to a clock input of the second flip-flop.

18. For use in a shared bus system comprising N bus devices capable of requesting access to a shared bus, a method for activating and de-activating a plurality of tristate line drivers coupled between the shared bus and the N bus devices, the method comprising the steps of:
- receiving a first bus access request signal from a first of the bus devices;
- receiving a second bus access request signal from a second of the bus devices;
- blocking the second bus access request signal when the first bus access request signal is enabled, the blocking step associated with a first delay;
- generating from the first bus access request signal a time-delayed first bus access request signal and generating from the second bus access request signal a time-delayed second bus access request signal, the generating step associated with a second delay;
- comparing the first bus access request signal and the time-delayed first bus access request signal and generating a first line driver enable signal only if both of the first bus access request signal and the time-delayed first bus access request signal are enabled; and
- comparing the second bus access request signal and the time-delayed second bus access request signal and generating a second line driver enable signal only if both of the second bus access request signal and the time-delayed second bus access request signal are enabled,
- wherein the second delay delays low-to-high transitions in the line driver enable signals by no more than one-half of a clock cycle of a clock signal, and
- wherein the first delay delays high-to-low transitions in the second line driver enable signal by an amount less than the second delay but does not delay high-to-low transitions in the first line driver enable signal.

19. The method as set forth in claim 18 further comprising the steps of:
- disabling the first line driver enable signal if either of the first bus access request signal and the time-delayed first bus access request signal is disabled; and
- disabling the second line driver enable signal if either of the second bus access request signal and the time-delayed second bus access request signal is disabled.

20. The method as set forth in claim 19 wherein the second delay is greater than a maximum de-activation delay period associated with the plurality of tri-state line drivers.

21. The method as set forth in claim 20 wherein the comparing steps comprise using a comparator circuit, the comparator circuit comprising:
- a first AND gate having a first input for receiving the first bus access request signal and a second input for receiving the time-delayed first bus access request signal; and
- a second AND gate having a first input for receiving the second bus access request signal and a second input for receiving the time-delayed second bus access request signal.

* * * * *